United States Patent [19]
Lynn

[11] Patent Number: 5,594,187
[45] Date of Patent: Jan. 14, 1997

[54] FORGED POWDER METAL CONNECTING ROD WITH STRESS RISER CREASE FORMED IN SIDE THRUST FACE

[75] Inventor: Jean C. Lynn, Bloomfield Hills, Mich.

[73] Assignee: Chrysler Corporation, Auburn Hills, Mich.

[21] Appl. No.: 626,658

[22] Filed: Apr. 2, 1996

[51] Int. Cl.$^6$ ............................................. C22C 38/00
[52] U.S. Cl. .......................... 75/246; 75/950; 74/579 R
[58] Field of Search .......................... 75/246, 228, 950; 92/187; 74/579 R

[56] References Cited

U.S. PATENT DOCUMENTS

| | | | |
|---|---|---|---|
| 32,117 | 4/1986 | Weaver | 29/423 |
| 1,630,759 | 5/1927 | Pierce | 29/156.5 |
| 2,553,935 | 5/1951 | Parks | 29/156.5 |
| 2,648,578 | 8/1953 | Stearns | 308/196 |
| 3,818,577 | 6/1974 | Bailey et al. | 29/413 |
| 3,864,809 | 2/1975 | Donachie | 29/420.5 |
| 3,889,350 | 6/1975 | Mocarski | 29/420.5 |
| 3,994,054 | 11/1976 | Cuddon-Fletcher | 29/156.5 A |
| 4,049,429 | 9/1977 | Donachie | 75/246 |
| 4,094,053 | 6/1978 | Weaver | 29/420 |
| 4,754,906 | 7/1988 | Brovold | 225/103 |
| 4,838,936 | 6/1989 | Akechi | 75/249 |
| 4,923,674 | 5/1990 | Weber | 419/27 |
| 4,993,134 | 2/1991 | Hoag et al. | 29/888.092 |
| 5,051,232 | 9/1991 | Summers | 419/27 |
| 5,208,979 | 5/1993 | Schmidt | 29/888.09 |
| 5,283,938 | 2/1994 | Jones | 29/416 |
| 5,460,776 | 9/1995 | Ackermann et al. | 419/44 |
| 5,516,483 | 5/1996 | Shivanath et al. | 419/14 |

FOREIGN PATENT DOCUMENTS

| | | |
|---|---|---|
| 55-154505 | 12/1980 | Japan . |
| 58-141301 | 8/1983 | Japan . |
| 5277843 | 10/1993 | Japan . |

OTHER PUBLICATIONS

"Powder Metallurgy Design Manual"; Metal Powder Indutries Federation.

"Powder Forged Connection Rods", Federal Mogul; pamphlet.

"Powder Metallurgy Design Solutions"; Metal Powder Industries Federation; Copyright 1993; Princeton, NJ.

*Primary Examiner*—Charles T. Jordan
*Assistant Examiner*—Daniel Jenkins
*Attorney, Agent, or Firm*—Kenneth H. MacLean

[57] ABSTRACT

This invention relates to an apertured connecting rod having a stress riser crease formed in one side thrust surface made by forging a powder metal sintered preform with a V-shaped notch mold formed in a side face whereby the spaced surfaces defining the V-shaped notch are folded inwardly toward one another during the forging to create a deep crease without any substantial width.

3 Claims, 2 Drawing Sheets

FORGED POWDER METAL CONNECTING ROD WITH STRESS RISER CREASE FORMED IN SIDE THRUST FACE

TECHNICAL FIELD

This application concerns a powder metal connecting rod having a forged-in stress riser crease provided in a side thrust face where maximum stress is created on the rod by a tension force during a cracking or fracturing process which separates a bearing cap portion from the remaining portion of the rod.

BACKGROUND OF THE INVENTION

Manufacturing a two-piece connecting rod with a main body portion and a separated bearing cap portion from a one-piece rod blank is known in the engine connecting rod art. A typical engine connecting rod has an apertured large end portion which is adapted to be installed about a crankshaft journal. Providing a separable bearing cap portion permits the large end portion to be installed about a crankshaft's journal. A previously known method to separate the bearing cap from a rod body is to actually saw the large end portion of the rod apart.

A more recent and preferred method of forming a separable bearing cap from a one-piece rod is to fracture or crack the rod into two parts across the large end portion. An axially directed tension force of relatively great magnitude is imposed on the rod to cause the fracture. The resultant fracture hopefully occurs across the apertured large end of the rod in a desirable location. A stress riser is typically formed on the rod for accurately positioning the initiation of the crack and to direct the progress of a desirable fracture. The stress riser is typically in the form of a notch, groove, or scribe formed by broaching or a similar mechanical cutting operation. Of course, with use, broaching tools wear and the resultant notch becomes less distinct with rounded edges which reduces the effectiveness of the stress riser and therefore increases necessary forces for cracking the rod.

A more recent method to cut stress risers is to use a laser energy source. Such a method is currently being practiced by Chrysler Corporation. The resultant laser formed stress riser is narrower and deeper than one formed by a broach. Unfortunately, the laser operation is relatively complex and requires much attention to achieve consistent results.

A preferred method to form a stress riser is applicable to a rod formed from powder metal such as steel particles. A green compact form of the rod is initially made by molding metal particles under significant pressure in a closed mold. The mold also has a configuration designed to create a generally V-shaped notch in one of the side faces of the green compact. The pressure molding produces a part in which metal particles are tightly unified and held together by mechanical interlocking so that the green compact is sufficiently stable for handling but is not strong enough to be used as a connecting rod. Next, the green compact is heated in a furnace to a temperature of about 2000 degrees F. and maintained at this temperature for a sufficient period of time to sinter the metal particles into a strong, unitary structure. The sintered preform or blank which results from this furnace treatment is much stronger than the green compact but still does not have sufficient strength for use as a connecting rod.

The sintered preform is then hot forged to increase density and strength. During the hot forging, the thickness of the sintered blank is reduced and the spaced apart surfaces defining the V-shaped notch are moved or folded inwardly toward one another to form a deep slit or crease of no substantial width.

Stress risers have been used to control rod cracking or fracture. Conventionally, stress risers have been located along the cylindrical surface of the aperture in the large end of the rod. When a tension force imposed on the rod, it is intended that the crack start evenly along the length of the stress riser and that the fracture progress straight through the rod. It has been found that when a stress riser is located in the above described cylindrical surface, the maximum stress develops at one end of the stress riser adjacent to the side thrust face and not evenly along the length of the riser. Resultantly, a small but significant percentage of such rods have after cracking been found to include a small third piece of metal between the bearing cap portion and the main body portion of the rod. The formation of this third piece is unacceptable since it may interfere with accurate remating of the bearing cap with the main body. Such rods are scraped.

In accord with the above background of the manufacture of connecting rods, the following U.S. patents are known: Reissue U.S. Pat. No. 32,117 to Weaver; U.S. Pat. No. 5,283,938 to Jones; U.S. Pat. No. 5,208,979 to Schmidt; U.S. Pat. No. 5,051,232 to Summers; U.S. Pat. No. 4,993,134 to Hoag et al.; U.S. Pat. No. 4,923,674 to Weber; U.S. Pat. No. 4,860,419 to Hekman; U.S. Pat. No. 4,838,936 to Akechi; U.S. Pat. No. 4,094,053 to Weaver; U.S. Pat. No. 4,049,429 to Donachie; U.S. Pat. No. 3,994,054 to Cuddon-Fletcher; U.S. Pat. No. 3,818,577 to Bailey et al.; U.S. Pat. No. 3,889,350 to Mocarski; U.S. Pat. No. 3,864,809 to Donachie; U.S. Pat. No. 2,648,578 to Stearns. The following foreign references are known: Japanese 58-141301; Japanese 55-15405; Japanese 5-277843;

SUMMARY OF THE INVENTION

This application concerns an improved unitary connecting rod suitable for cracking into the typical two-piece rod with a mating bearing cap portion. The first step in manufacture of the rod is to pressure mold powder metal (steel) in a closed mold. The green compact which is produced has particles of metal mechanically interlocked to form a stable but weak part. The mold is configured to form a stress riser in the green compact. More specifically, a pair of generally V-shaped notches are formed in a side thrust face, one to either side of the rod's aperture. Next, the green compact is heated in a furnace at about 2000 degrees F. to bond or sinter metal particles together which forms a sintered preform or blank. The sintered preform is sufficiently strong for many parts but is not strong enough for use as a connecting rod.

The sintered preform is then hot forged at about 1800 degrees F. to increase density and strength. This also configures it to the desired final rod configuration. During hot forging, the spaced surfaces of the V-shaped notch are moved or folded toward one another but are not joined or bonded. This creates a deep crease of no substantial width. Then, the rod with the above described crease is cracked to form the separate bearing cap portion.

In a typical cracking operation, the aperture in the large end of the rod is inserted about a cylindrical surface defined by a two-part or split mandrel. Subsequently, force is applied to one mandrel part which tends to separate it from the other mandrel part which is maintained stationary. This imposes a tension force upon the rod and particularly across the greases. It has discovered that when a tension force in imposed on the rod to initiate cracking, maximum stress is created along one side thrust face of the rod adjacent the tensioning apparatus. Accordingly, applicant locates the notch which becomes the crease along the side thrust face of the rod. This has resulted in production of very consistent crack characteristics including flat and co-planar fracture planes. Summarizing, by locating the forged-in crease in this side thrust face where the stress is the greatest, the following characteristics are incurred: decreased tension forces necessary to crack a rod; consistent formation of substantially flat and co-planar fracture surfaces; and substantial elimination of the formation of any separable third pieces.

Therefore, an object of the invention is to provide a forged powder metal connecting rod that is readily fractured into main body and bearing cap portions and is characterized by substantially flat and co-planar fracture planes and by absence of an undesirable third piece.

A further object of the invention is to provide an improved powder metal connecting rod in the form of a hot forged sintered preform having a crease-like stress riser formed in a side thrust face and positioned to either side of the aperture. The crease has a relatively great depth and no substantial width thus facilitating ease in cracking the rod into two pieces without formation of an undesirable third piece.

Other objects and advantages of the invention will be apparent to one skilled in the engine and connecting rod art.

DESCRIPTION OF EMBODIMENT SHOWN IN THE DRAWINGS

The Improved Hot Forged Connecting Rod

Figure 1:
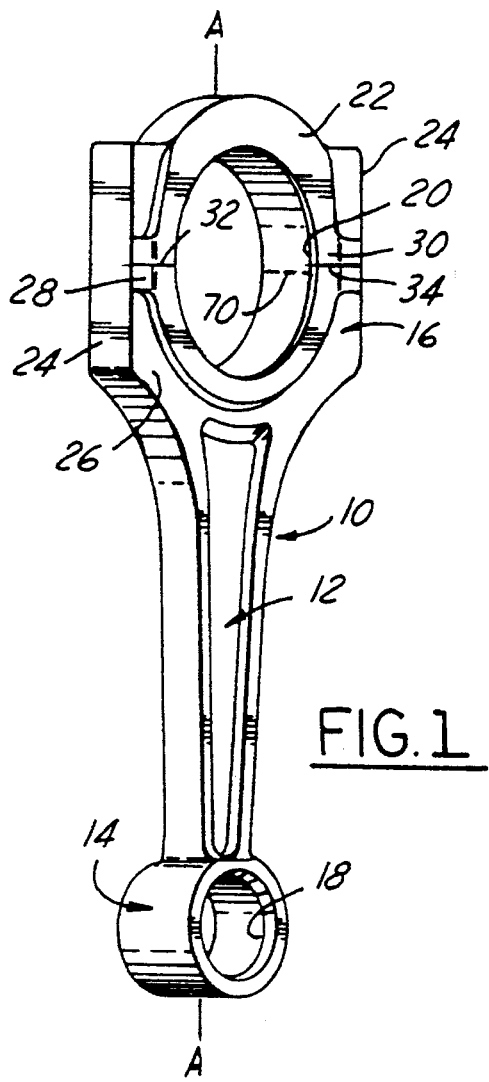
FIG. 1 is a perspective view of the one-piece connecting rod showing a forged-in crease in a thrust face side surface prior to cracking.

In FIG. 1, a one-piece connecting rod 10 is illustrated prior to being cracked into a two-piece rod with a separable bearing cap portion. The rod 10 has an elongated configuration extending along longitudinal axis A—A. Visible in FIG. 1 are: a midportion 12; a small end portion 14; and a large end portion 16. A bore 18 is formed through the small end portion 14 and is adapted to receive a wrist or piston pin (not shown) as is well known in the engine art. An aperture 20 is formed through the large diameter end 16 and is adapted to receive a journal of a crankshaft (not shown) as is well known in the engine art. The large end portion 16 has a side thrust face 22. An opposite side thrust face 22" is visible in FIG. 8. The rod's large end portion 16 has a pair of oppositely facing edges or end surfaces 24. In the particular design of the connecting rod shown in FIG. 1, the side thrust face 22 is in a raised plane with respect to the remaining side surface 26. Side thrust face 22 also includes a pair of radially outwardly extending portions 28, 30 located to either side of aperture 20. Portions 28, 30 extend radially outward from aperture 20 and terminate at end edges 24.

As shown in FIG. 1, a pair of slits or creases 32, 34 are formed in the side thrust face including extensions 28, 30. Each crease 32, 34 is arranged to one side of aperture 20 and they are substantially aligned across aperture 20. Creases 32, 34 extend inwardly from surfaces 28, 30 to a considerable depth as is evident by examination of the leftward end 24 and the cylindrical surface which forms the bore 20.

The Green Compact and Sintered Preform

Figure 2:
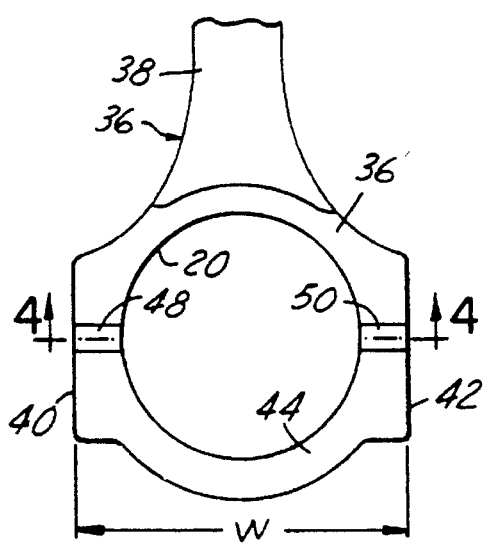
FIG. 2 is an elevational front view of the large end portion of a sintered preform or blank form of the rod.
Figure 3:
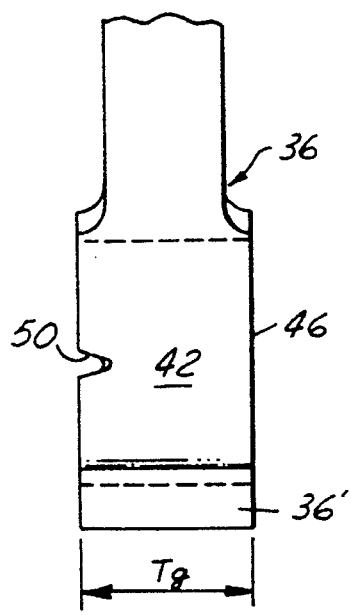
FIG. 3 is an elevational side view of the large end portion of the rod blank shown in FIG. 2.
Figure 4:
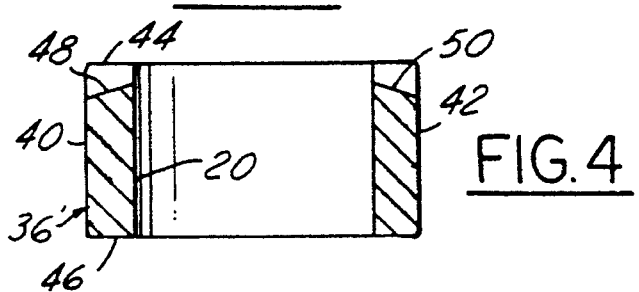
FIG. 4 is a sectioned view taken along section line 4—4 in FIG. 2 and looking in the direction of the arrows.

FIG. 2–4 illustrate the enlarged end portion 36' of the green compact and sintered preform configuration 36. A portion of its midportion 38 is also seen. Basically, a green compact is the form of the rod produced by molding steel powder metal particles in a closed mold under great pressure, typically about 80,000 psi. This pressure molding causes the particles to mechanically interlock and form a stable, relatively weak part but strong enough for handling. Next, the green compact is heated in a furnace at about 2000 degrees F. for a period of time sufficient to sinter or cause metal particles to bond thereby producing the sintered preform or blank form of the rod. The preform has the same configuration as the green compact but is much stronger of course. For some applications, a sintered preform or blank has sufficient strength for use without further processing. However, a connecting rod requires great strength and so the sintered preform must be further treated as discussed later.

During pressure molding of the green compact, its length and width W are molded to the actual desired width and length of the rod shown in FIG. 1. Because the green compact and sintered preform will be further processed to increase strength and density, its thickness Tg ("g" referring to the green compact form) is significantly greater than the respective thickness of the final rod shown in FIG. 1. Also, the midportion 38 and small end portion are also thicker that in the final rod 10.

As seen in FIG. 2–4, the molded green compact has the following general features: a large end portion with an aperture 20; edge surfaces or ends 40, 42; and side surfaces or faces 44, 46. Also, a pair of generally V-shaped notches 48, 50 are mold formed in situ in the side face 44, one on either side of aperture 20. Now looking to FIG. 3, the V-shaped configuration of the notch 50 is best shown. Also, the depth of the notch is about one fifth of the thickness Tg.

Looking to FIG. 4, further details of the notch are apparent. Specifically, a variable depth configuration is shown in which the notch depth is least adjacent the aperture and increases outwardly to the end surface or edge. The value of providing a variable depth notch will be more easily understood from the discussion of the hot forging step set out later in this application. The object is to finish with a stress riser which has a generally constant depth as measured from the side thrust face.

The Hot Forged Rod

Figure 5:
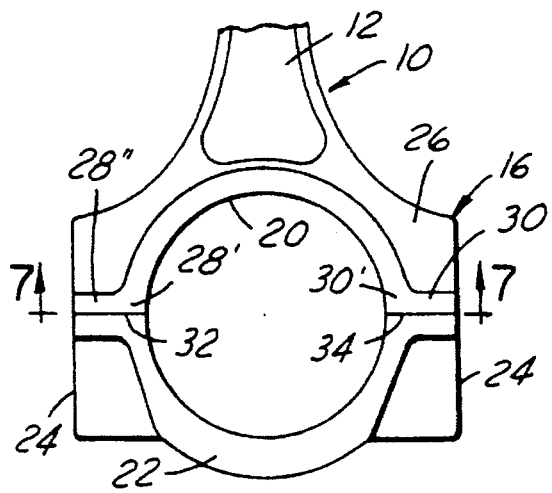
FIG. 5 is an elevational front view of the large end portion of a hot forged form of the rod showing the stress riser crease prior to cracking.
Figure 6:
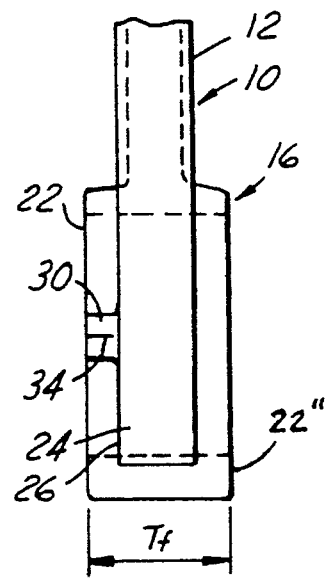
FIG. 6 is an elevational side view of the large end portion shown in FIG. 5.
Figure 7:
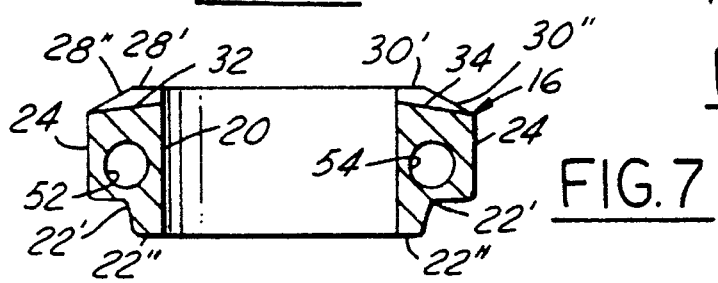
FIG. 7 is a sectioned view taken along section line 7—7 in FIG. 5 and looking in the direction of the arrows.

The sintered preform is hot forged to increase density and strength as required for a connecting rod. Typically, it is hot forged in a press at a pressure of about 60,000 psi and at a temperature of about 1800 degrees F. In addition to the view of the rod's final configuration in FIG. 1, further details are revealed in FIG. 5–7. When the forged rod shown in FIG. 5–7 is compared to the sintered preform 36 shown in FIG. 2–4, the changes in the configuration of the rod are apparent. The depth or thickness of the forged rod have been significantly decreases by the hot forging operation. Note that the thickness Tf ("f" for forged) is only about 80% of thickness Tg of the sintered blank or green compact. Also, note in FIG. 7 that the hot forging has formed an indented surface portion 22' inwardly from the one side face or surface 22".

Referring to FIG. 7, the hot forging has altered the configuration of the upper side face or surface of the rod. The face now includes a new surface configuration including a radially inwardly located flat portions 28', 30' which are in a plane normal to the axis A–A. Also created are radially outwardly located angled or inclined surface portions 28", 30".

Hot forging also alters the spaced surfaces forming notches 48, 50 in the sintered preform. These surfaces are moved or folded inwardly toward one another to form creases 32, 34. The creases have considerable depth but no substantial width. The closing of the notch surfaces do not result in bonding or sintering of one to the other as the temperatures are lower that the furnaces 2000 degrees F. Also, an agent or means is used to prevent bonding.

Referring now back to FIG. 4, the formation of the notches 48, 50 in the green compact and sintered preform are shown. These notches have a variable depth so that the depth is least adjacent the aperture 20 and greater toward edge surfaces 40, 42. The creases 32, 34 which are formed from the notches by hot forging have a relatively consistent depth as measured from surfaces 28', 28" and from surfaces 30', 30". With a rod having a non-planar side surface as seen in FIG. 7. The use of a variable depth notch in the green compact and sintered preform is needed to produce consistent depth creases. In other words, without the variable depth notch a rod with inclined surfaces like 28" and 30" would then have a shallower crease adjacent the outer edges 24. Or at the worst, the crease might not extend all the way from the aperture 20 to the edge 24.

Also as seen in FIG. 7, after formation of the rod 10 by hot forging and before cracking the rod, a pair of bores 52 and 54 are made in the large end. The portion of the bores 52, 54 extending in the subsequent body portion of the rod are threaded to receive threads of cap screws (not shown) as is well known in the engine art. After the bearing cap is formed by cracking the rod, the cap screws resecure the bearing to the body of the rod.

Cracking Process

Figure 8:
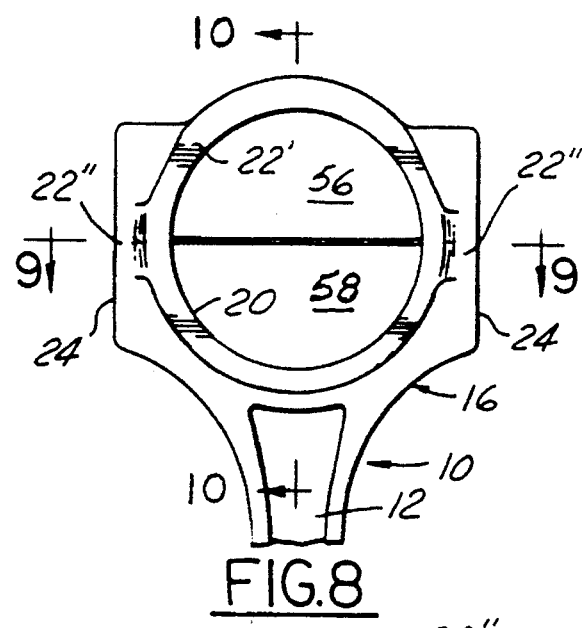
FIG. 8 is an elevational side view of the large end portion of a one-piece forged rod mounted about a split cylinder formed by separable mandrels and prior to cracking.
Figure 9:
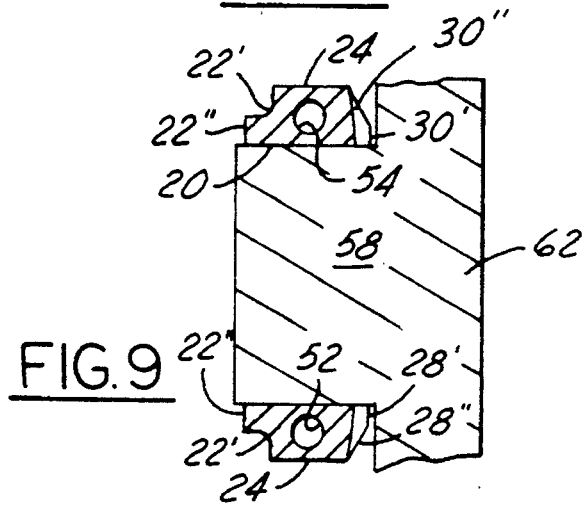
FIG. 9 is a sectioned view taken along section line 9—9 in FIG. 8 and looking in the direction of the arrows.
Figure 10:
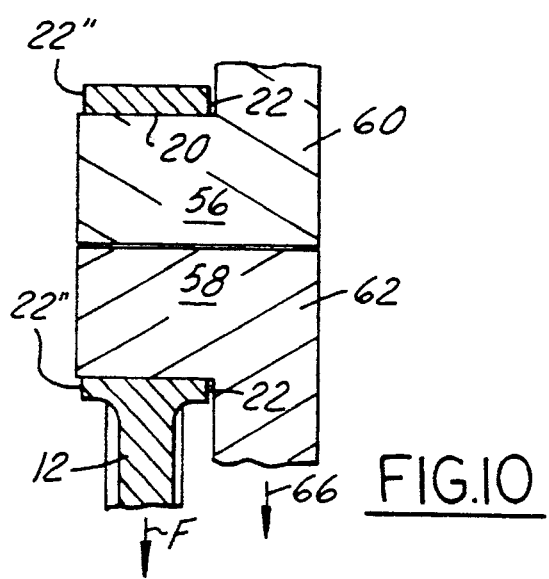
FIG. 10 is a sectioned view taken along section line 10—10 in FIG. 8 and looking in the direction of the arrows.

An apparatus in somewhat simplified form for applying tension forces across the large end portion of the rod is shown in FIG. 8–11. When the tension force is great enough, the one-piece rod 10 is fractured to form the typical two-piece rod consisting of a body and a bearing cap. In FIG. 8, aperture 20 in the large end portion 16 of the hot forged rod 10 is shown. The aperture encircles a two-part, split mandrel defined by two semi-cylindrical parts 56 and 58. Referring now to FIG. 10, the semi-cylindrical parts 56, 58 are operably connected respectively to support structures 60, 62. Parts 56, 58, are sized to form a cylinder slightly smaller than aperture 20 to ease mounting of the rod end about parts 56, 58. After the rod is located about parts 56, 58, a mechanism separates parts 56, 58 slightly under a relatively light force. This takes up looseness and therefore rigidly secure the rod to the tensioning device.

In FIG. 10, the support structures 60, 62 are integrally attached to parts 56, 58, respectively. The upper part 60 is fixed and the lower part 62 is operatively connected to a hydraulic force producing mechanism to impose a relatively great force 66 on the part 62 which tends to move it downward away from part 60. This creates a tension force across the creased portion of the rod and eventually causes the rod to crack and fracture. After the rod is fractured, the parts 58, 62 move slightly downward and then back upward toward the original position. The slight gap shown in FIG. 11 between cylindrical surface 20 and surface 68 of part 58 shows that the rod has been cracked and fractured.

As previously mentioned, the conventional position of the stress riser is along the circumferential surface which defines aperture 20. This position is shown in FIG. 1 by broken line 70. As explained, this location of the stress riser will occasionally produce inconsistent results. It has found that a tension force applied across the large end portion of the rod 10 creates a maximum stress level along the side thrust face 22 of the rod or specifically at surfaces 28', 28" and surfaces 30', 30". The maximum stress is not created along the cylindrical surface. In this application, the stress riser creases 32, 34 are located in the side thrust face 22 adjacent to the tensioning structures 60, 62 where a maximum stress is created. Resultantly, the consistency of the cracking results are improved.

Figure 11:
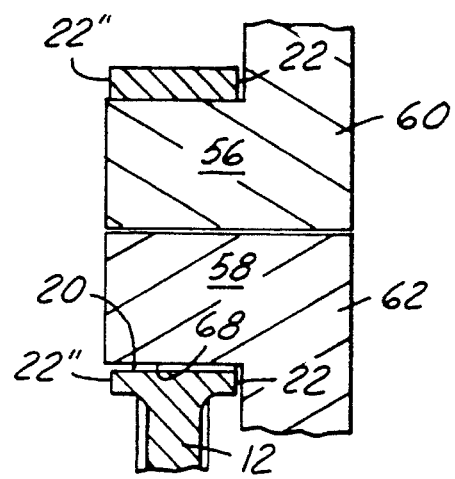
FIG. 11 is a sectioned view similar to the view of FIG. 10 but of a cracked rod.

In FIG. 11, a tension force sufficient to crack the rod has been applied. The crack starts at the bottom of creases 32 and 34 in side thrust face 22 and progresses toward the opposite side thrust face 22". Evidence that the rod has been cracked is visible in FIG. 11 by the space between surface 68 and 20.

Although only one embodiment of the various forms of the rod, namely a green compact, a sintered preform, and a forged rod have been illustrated and described in detail and only one apparatus to tension and crack the rod has been illustrated and described in detail, it is contemplated modifications to these are comtemplated which would still fall within the scope of the invention as defined by the following claims.

I claim:

1. An improved unitary connecting rod which is easily cracked to form a separable bearing cap manufactured by hot forging a molded powder metal sintered preform which has an apertured large end portion and a notched side thrust face, the improved unitary rod comprising: a stress riser crease formed in a side thrust face by to concentrate stress developed during cracking caused by the application of a large tension force upon the rod and across the stress riser crease; the stress riser crease being forge formed by inward movement of the spaced surfaces defining the notch in the sintered preform and being characterized by a great depth with respect to its width.

2. An apertured connecting rod made by: molding powder metal into a green compact, sintering the green compact to produce a preform, and forging the preform; the green compact having an aperture with an adjacent side thrust face; a pair of generally V-shaped notches mold formed in a side face of the green compact one to either side of the apertrue; the metal particles of the green compact being subsequently bonded by heat to form a sintered preform with the notches intact; each notch having a pair of spaced surfaces inclined with respect to one another; the sintered preform being hot forged to increase its density and strength and cause the spaced surfaces to move inwardly toward one another to create a deep crease with substantially no width so that the rod can be easily cracked by imposing a tension force longitudinally on the rod, whereby a crack starts at the bottom of the creases and the rod is fractured along a generally flat plane progressing form the crease towards and opposite side face.

3. The connecting rod set forth in either claim 1 or claim 2 in which the side thrust face of the forged rod has an non-planar configuration with a portion inclined with respect to the side face; the V-shaped notch in the green compact and in the sintered preform having a depth which varies in the radial direction from a relatively shallow depth adjacent the aperture to a greater depth adjacent the outer edge whereby forging the preform creates a crease in the forged unitary rod characterized by a generally constant depth measured from the non-planar side face.

* * * * *